Patented June 14, 1927.

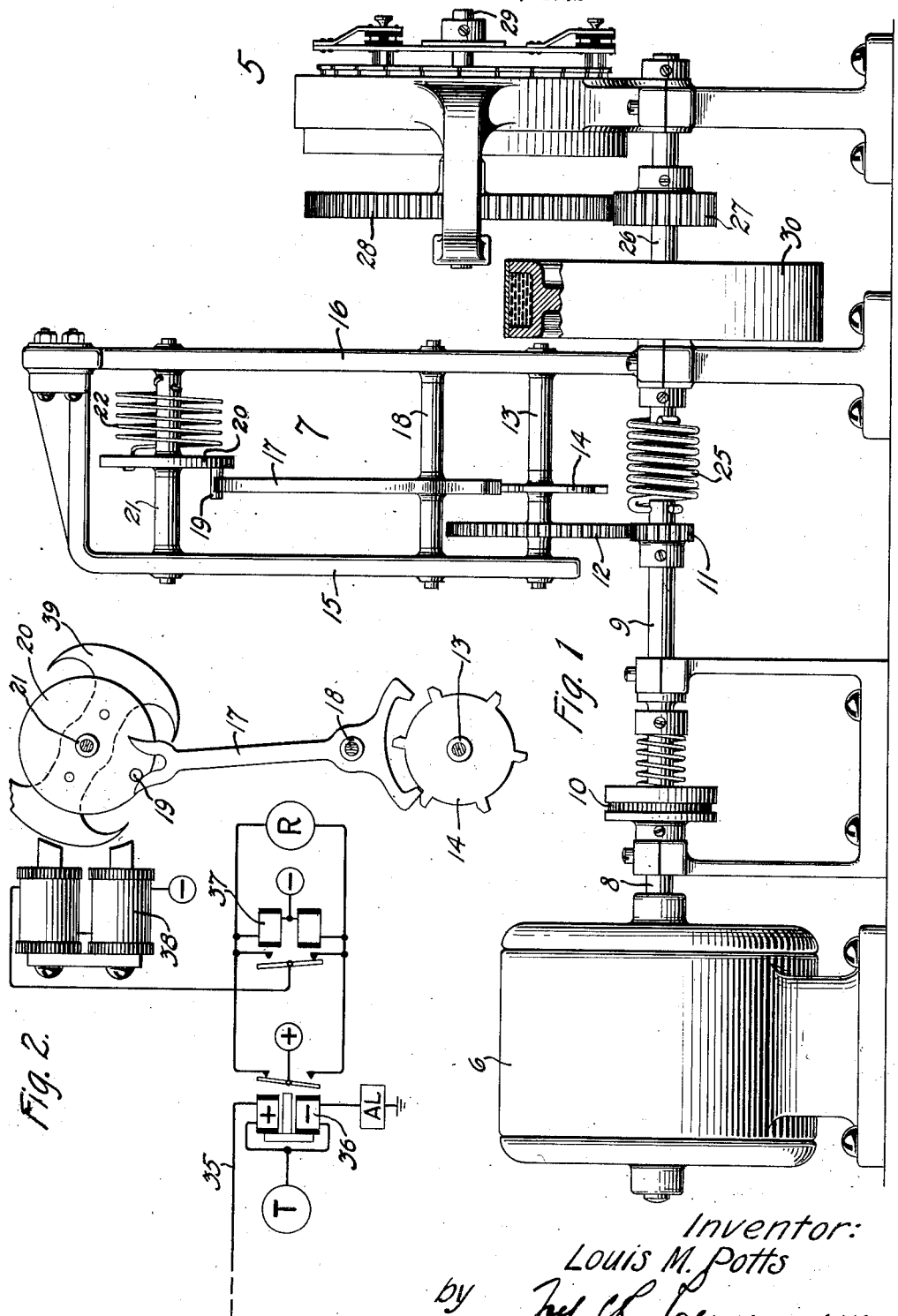

1,631,982

UNITED STATES PATENT OFFICE.

LOUIS M. POTTS, OF HIGHWOOD, NEW JERSEY, ASSIGNOR TO WESTERN ELECTRIC COMPANY, INCORPORATED, OF NEW YORK, N. Y., A CORPORATION OF NEW YORK.

CONTROL MECHANISM.

Application filed October 9, 1922. Serial No. 593,292.

This invention relates to driving mechanism, particularly adaptable to printing telegraph apparatus.

An object of this invention is to provide a continuous and uniform movement of a driven member irrespective of speed variations of the driving means.

In accordance with the embodiment disclosed, means comprising a balance and escapement mechanism in combination with a torsion spring is provided for accomplishing the above object.

Referring to the drawing, Fig. 1 illustrates one embodiment of the invention; while Fig. 2 shows diagrammatically an application of the invention to a telegraph system.

For the purpose of illustration, the invention is shown as applied to a current impulse distributor 5, which may be of the multiplex or continuously operated type, and which is driven by means of the torsion spring 25, the torsion of the spring being controlled by a continuously operated motor 6 and a balance and escapement mechanism 7. The motor 6 may be any one of a plurality of different types, such as, a shunt wound, series wound or an induction motor or any other source of motive power.

The motor 6 has its driving shaft 8 connected with a shaft 9 by means of a friction clutch 10. Rigidly secured to the shaft 9 is a driving pinion 11, which has its teeth meshed with a gear wheel 12. The gear wheel 12 is mounted on a shaft 13, which also carries an escapement wheel 14, and which is journaled in a pair of uprights 15 and 16. The balance and escapement mechanism also comprises an anchor 17 rigidly secured to a pivoted shaft 18; an impedance pin 19 secured to a balance wheel 20, which is mounted on a shaft 21 supported by the uprights 15 and 16 and adapted to move in a manner whereby the pin 19 engages the fork of the anchor 17; and a helical spring 22, which has one end fastened to the balance wheel 20 while the other end is fixed to the shaft 21. The escapement wheel 14 is provided with six teeth so that a suitable relation exists between the speed of the balance and escapement mechanism and that of the distributor.

As the shaft 8 rotates, shaft 9 through friction clutch 10 is placed under tension tending to rotate. Due to this tension which is communicated through gears 11 and 12, to escapement wheel 14, shafts 9 and 13 move step-by-step under the control of anchor 17 and balance wheel 20. The operation of the balance and escapement mechanism is well understood.

The escapement wheel 14 rotates until it is stopped by the engagement of the radial faces of the escapement wheel 14 with one pallet of the anchor 17. The balance due to its inertia continues its swing and on its return, the impulse pin 19 engages the fork of the anchor 17 releasing the escapement wheel 14 and allowing shafts 9 and 13 to rotate. The engagement of the bevelled faces of the escapement wheel teeth with the pallets on the anchor 17 gives an impulse to the balance wheel 20 which in this manner, maintains its balance. As the balance swings, the shafts 9 and 13 move step by step with intervals of rest, the length of which is determined by the relation of the rate of the balance to the speed of the motor 6.

To convert the intermittent motion thus produced into continuous motion, thereby causing the distributor 5 to be operated continuously and with uniform velocity, a helical spring 25 and a fly wheel 30 are provided. Spring 25 is connected intermediate shafts 9 and 26 and is relatively short so that its tension changes rapidly for a small rotation of its ends. The fly wheel 30 has considerable inertia so that the energy produced by its rotation is large compared with the energy dissipated by the functioning of the distributor during the intervals of rest of shaft 9. Fly wheel 30 preferably has a hollow rim filled with mercury and may be of the type described in Patent No. 1,230,205, to Harold W. Nichols. With this type of fly wheel, it has been found possible to dampen out all fluctuations or vibrations of the shafts so that any increase or decrease in speed will be at a uniform rate. By means of the balance and escapement 7 the number of revolutions of shaft 9 is accurately controlled. The rotation, however, is intermittent, the spring 25 accordingly being intermittently wound up. The shaft 26 is under tension of spring 25 which is increasing and decreasing at rapid intervals, but due to the large inertia of fly wheel 30 shaft 26 cannot follow these changes and its motion is regular and uniform, but the number of revolutions for a given time interval will be the same as the number of revolutions of shaft 9. The rotative action of shaft 26 is communicated to the shaft 29 of distributor 5 through gears 27 and 28 whereby the shaft 29 has imparted thereto a continuous and uniform motion. The balance equipment mechanism allows the inertia stored in the spring 25 to be released intermittently. Such interruptions being sufficiently frequent so as not to permit the direct action of the motor to make any appreciable difference in the speed of the distributor shaft. As the power supplied by the motor 6 ceases due to the action of the balance and escapement mechanism power is supplied by spring 25. Each of such movements is in the same direction, as the spring 25 normally tends to rotate shaft 26 so that this shaft has imparted thereto a continuous movement of rotation as distinguished from an intermittent movement. By the provision of a balance and escapement mechanism in combination with a fly wheel and spring, it is possible to drive shaft 26 or any other element or mechanism at a uniform and predetermined rate notwithstanding the fact that the motor may be running at a much faster and irregular rate.

A line conductor 35 is shown in Fig. 2, which extends from a distant station and has associated therewith duplex equipment for permitting duplex operation thereover. Connected to the apex of the ratio arms is a transmitter T for the transmission of telegraphic signals. Serially connected with the line conductor 35 and the artificial line AL is a relay 36 which controls through its contacts, the energization of relay 37 and the operation of a receiving printer shown diagrammatically at R. Relays 36 and 37 through their contacts, transmit at each reversal of relay 36, a short impulse through magnet 38. Disposed in operative relation to circular shaped pole pieces of the magnet 38 is a member 39 having diametrically opposite crescent-shaped portions which are formed in a manner such that one accurately balances the other. The member 39 is rigidly secured to the balance wheel 20 and thereby oscillates with this wheel. Upon the energization of relay 37 which responds to the operation of relay 36 in accordance with the impulses transmitted over the line conductor 35, magnet 38 will be energized. This magnet in energizing, tends to retard or accelerate the movement of the balance wheel 20. In this particular modification, it is preferable to have the period of the balance correspond with the frequency of operation of relay 36 so that the correcting action just referred to will cause the balance to swing in an exact and uniform phase relation with the operation of relay 36 although the natural motion of the balance differs slightly from the frequency of relay 36.

Although the invention has been shown as applied to a particular type of system, it is obvious that variations may be made without departing from the spirit and scope of the invention.

The invention claimed is:

1. In a vibrating device, means for setting up a magnetic field, a vibrating member lying within said field, means for driving said vibrating member, and means for varying the intensity of said field to vary the rate of vibration of said member.

2. In a vibrating device, means for setting up a magnetic field, a vibrating member lying within the magnetic influence of said field, mechanical means for driving said vibrating member, and means for causing a variation in said magnetic field to vary the rate of vibration of said vibrating member.

3. In combination, a driven shaft, means for driving said shaft at a uniform speed comprising a source of motive power, reciprocating means for periodically controlling the application of said motive power, and means intermediate the driven shaft and the driving means for imparting a continuous and uniform motion to said shaft.

4. In combination, a driven shaft, means for driving said shaft at a predetermined and uniform speed comprising a source of motive power, a reciprocating balance wheel and escapement mechanism to periodically control the application of said motive power, and means intermediate the driven shaft and the driving means and controlled by the balance and escapement mechanism for imparting a continuous and uniform motion to said shaft.

5. In combination, a driven shaft, means for driving said shaft at a uniform speed comprising a motor, a reciprocating balance and escapement mechanism to periodically control the application of said motor, and a spring connecting said driven shaft, and driving means for imparting a continuous motion to said shaft during intervals when said balance and escapement mechanism is effective, the tension of said spring being controlled by said balance and escapement mechanism.

6. In combination, a driven shaft, means for driving said shaft at a uniform speed comprising a motor, a balance and escapement mechanism having a natural period of operation, connecting means between said motor and said balance and escapement mechanism periodically arrested by the action of the balance and escapement mechanism, and means intermediate said driven shaft and the connecting means for imparting a continuous motion to said shaft during the periods that said connecting means is arrested.

7. In combination, a driven shaft, means for driving said shaft at a uniform speed comprising a motor, a balance and escapement mechanism having a natural period of operation to periodically control the application of said motor, a spring connecting the driven shaft with the driving means for imparting continuous motion to said shaft during the periods that said balance and escapement mechanism is effective, and a fly wheel possessing considerable inertia associated with said shaft for dampening out fluctuations in the speed thereof produced by the action of said spring.

8. A distributor comprising a plurality of conducting segments, a brush arm arranged to bridge the conducting segments, means for driving said brush arm at a predetermined and uniform speed consisting of a motor, connecting means between said motor and brush arm, a balance and escapement mechanism having a natural period of operation for periodically controlling the application of power from said motor to said connecting means, and means rendered effective by the action of said balance and escapement mechanism for imparting to said distributor arm a continuous motion during the periods that said balance and escapement mechanism acts on said connecting means.

9. In combination, a driven shaft, means comprising a balance and escapement mechanism to control the motion of said shaft, an electromagnet adapted to alter the rate of vibration of said balance by direct electromagnetic action, and means to energize said magnet.

10. In combination, a shaft, means to rotate said shaft, a body capable of periodic motion and adapted to control the rate of rotation of said shaft, means to continuously maintain the periodic motion of said body by the same power which rotates the shaft, a local circuit, means to open and close said circuit intermittently, and means to alter the periodic motion of said body according to the intermittent opening and closing of said circuit.

11. In combination, a segmented distributor, a brush adapted to make contact successively with the segments, means to drive said brush arm, a local circuit, means to intermittently open and close said circuit, means to control the speed of said brush so that a fixed phase relation is maintained between the opening and closing of said circuit and the passage of the brush over adjacent segments, said speed control means comprising a body capable of periodic motion, and a phase correcting device controlled by the opening and closing of said circuit, said body being kept in motion by the same power which drives the brush arm.

12. The method of adjusting the frequency of vibration of an electro-mechanically driven vibrating element comprising magnetic material without bringing the element to rest, which comprises varying the strength of a magnetic field in which the magnetic material vibrates.

In witness whereof, I hereunto subscribe my name this 6th day of October A. D., 1922.

LOUIS M. POTTS.